United States Patent Office 2,757,149
Patented July 31, 1956

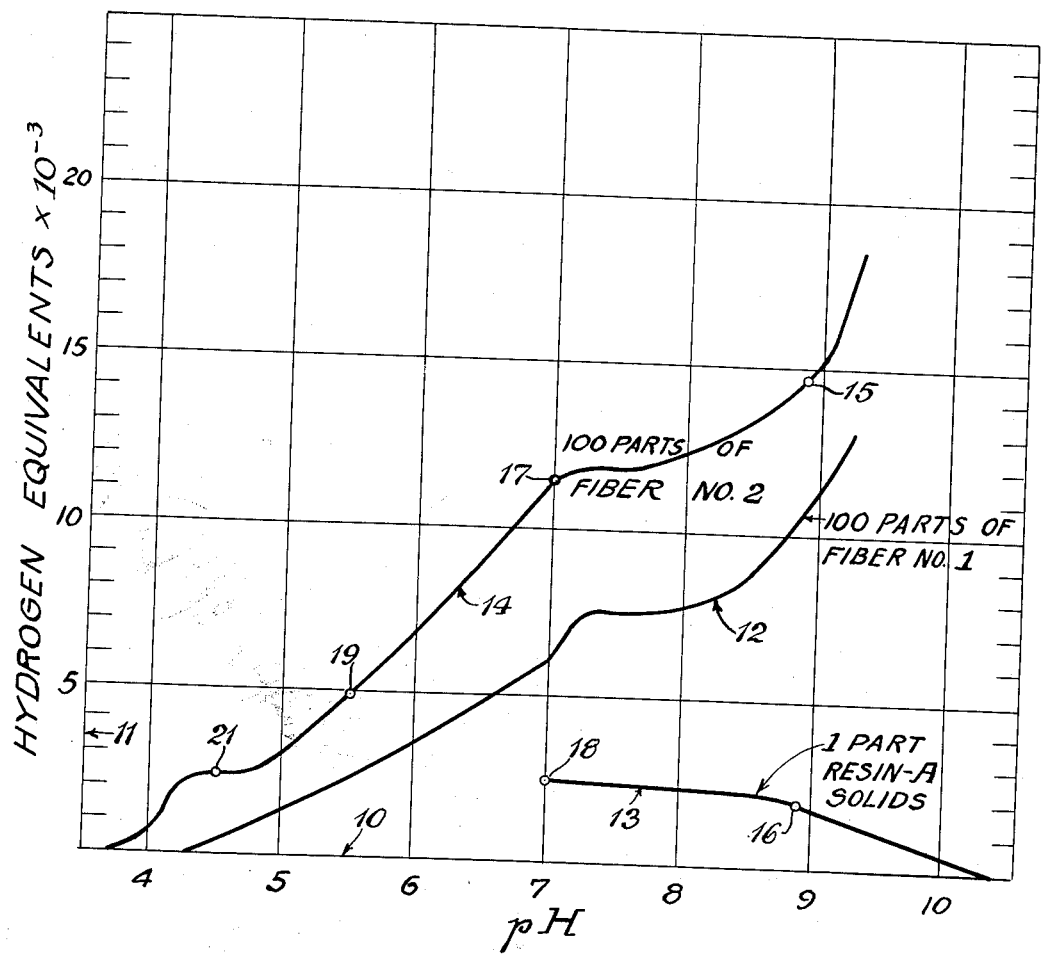

2,757,149

REACTIVE PRECIPITATION OF RESIN ON FIBERS

Clark C. Heritage, Tacoma, Wash., assignor, by direct and mesne assignments, of one-half to Weyerhaeuser Timber Company, Tacoma, Wash., a corporation of Washington, and one-half to Wood Conversion Company, St. Paul, Minn., a corporation of Delaware Application January 30, 1953, Serial No. 334,165

12 Claims. (Cl. 260—17.2)

The present invention relates to the production of fiber-resin products by the application of thermosetting material to comminuted wood particles, such as sawdust, or wood defibered substantially entirely to ultimate fibers and opened up bundles of ultimate fibers, or to mixtures of equivalent forms in which surfaces of the ultimate fibers of the wood are available for deposition thereon of thermosetting resin-forming solids.

It is the general object of the invention to make highly efficient use of a relatively small quantity of thermosetting resin-forming solids by application of liquid material from which such solids may be deposited on the surfaces of the fibers in the wood particles.

It is a particular object of the invention to deposit the resin material on the fibers of the wood particles by precipitation from applied aqueous solution, resulting from chemical reaction involving reactive content of the wood substance itself.

It is a particular object of the invention to apply an alkali-stabilized aqueous solution of resinous material to wood particles containing acid generated by steaming the raw wood substance, the proportioning of materials preferably being such as to effect neutralization of all the stabilizing alkali in the applied resin solution.

A further object of the invention is to effect a controlled generation of the acid to an extent predetermined by the character of the resin solution to be employed, the quantity of resin solids to be applied, and the quantity of the acid to be retained.

A particular object of the invention is to reduce raw wood to fiber-exposing particle form in an acid-generating environment of steam, and applying to the resulting wood particles an alkali-stabilized aqueous solution of resin while said wood particles are confined in an environment of steam.

Various other and ancillary objects and advantages of the invention will become apparent from the following description and explanation of the invention given hereinafter, in connection with the accompanying drawing.

In the drawing, the alkali-binding capacity of wood in two forms and at various pH values is shown, and also the acid-consuming capacity of a given quantity of alkali-stabilized resin solution at various pH values.

Raw wood is naturally acid at a pH value around 4. Many of the properties of wood result from its acidity. When raw wood fibers are mixed with aqueous alkali-stabilized solution of thermosetting phenol-formaldehyde resin, the alkali-binding power of the wood imposes limits of usage of resin solids for retaining an acid character, and imposes increasing higher limits of usage when increasing the pH of the resulting fibers above pH of 7. As usage of such resin solution is increased a point is reached at which the available acid of the fibers is utilized and the pH of the fibers becomes that of the resin solution. Any further increase in usage increases the amount of available alkali in the system containing the fibers and also dissolved resin.

The alkali-stabilized solution above referred to is one from which resin solids may be precipitated by lowering the pH as by adding acid to neutralize at least that portion which is effective to retain resin solids in solution. However, that kind of solution is merely typical of any aqueous solution of thermosetting resin solids at a pH such that lowering the pH precipitates substantially all of the resin solids. The initial and the precipitating pH values may each be above, at, or below pH of 7 so long as the initial pH is higher than the precipitating pH.

The present invention has arisen in developments intended for large scale production using wood and such a phenol-formaldehyde resin solution. In consequence the invention will be explained by detailed reference to these materials without any intention to limit the invention thereby.

According to one phase of the invention raw wood particles as described are so associated with such a precipitatable resin solution that substantially all of the resin solids are precipitated onto the particles, and the particles may thereafter have any pH value above that of the raw wood and not over that pH at which the resin precipitation is completed.

Since the amount of resin from any specific kind of resin solution is limited by the available acid in the raw wood particles, another and a preferred phase of the invention involves processing the raw wood to increase its acid content by generating acid from original wood substance. Thereby, the limiting quantity of resin is raised, or at usages below the limiting quantity, the resulting pH value of the coated wood particles is lower than if the particles were raw and not so processed.

It is known that natural wood substance is chemically altered when maintained in an environment of steam over a period of time ranging from a matter of a few seconds such as 30 seconds to longer times, and at steam pressures and temperatures ranging from atmospheric pressure upwardly to such pressures that certain undesirable temperatures and reactions are encountered. There are critical steaming conditions at which there is a gasification of the wood substance including the generation of furfural from pentose sugars, evidenced later in the product by the severe darkening which accompanies furfural. Time and temperature of steaming are involved. For example, in two comparative cases, there is appreciable gasification and darkening after 2 minutes at 200 p. s. i. g. (388° F.), and after 4 minutes at 175 p. s. i. g. (377° F.). Where the term "non-gasifying conditions" is herein employed it signifies a time and temperature below that critical combination where furfural is formed and the wood is appreciably darkened. The term "critical steaming conditions for gasification" refers to that combination of time and temperature beyond and above which furfural forms in amounts appreciably to darken the wood substance.

Below such critical steaming conditions for gasification, the wood particles have lighter color, the color, however, being lighter in inverse proportion to the amount of change effected in the wood substance in the steam environment. Extension of time or of temperature or both, for the reaction in the steam environment produces effects evidenced by increase in the water-extractable content of the resulting wood. However, other factors modify the generation of water-soluble material, such factors including the kind of wood, the season in which the wood is cut, and the amount of water associated with the wood at the time of the action in the steam environment. Changes in the natural wood substance are also evidenced by changes in the pH value of a water-suspension of the wood, such pH value being the conventional one used to indicate the pH of the wood itself.

The present invention is based upon use of the natural and augmented acidity of whole wood. When wood is subjected to a steam environment short of the critical steaming conditions for gasification as above referred to, the useful acidity may be augmented and controlled. In general, as the time or temperature of the treatment in steam is increased, the alkali-binding power of the resulting wood substance is increased. Alkali-binding material is generated from normal constituents of natural wood without adversely affecting the general appearance and character of the treated wood material as being whole wood substance. A specific evaluation of the generated alkali-binding content is immaterial. For the purpose of identification, such acid-acting ingredients are referred to herein merely as acids regardless of their true chemical composition. It is known that a small amount of acetic acid may be found among the steam-generated acids, and this is mentioned as it is an example of a volatile acid, of which others may be present. Under certain conditions of operation, volatile acid may escape from the wood particles, yet in such instance there is an effective residual content of non-volatile acids for the purposes of the present invention. Under other conditions of operation the volatile acid may be effectively retained by the wood particles, or in whole or in part it may be utilized effectively in precipitating resin solids on the wood particles.

For example, the process of defibering wood chips in an environment of steam as described by Asplund in U. S. Patents No. 2,008,892 and No. 2,145,851, is well known and widely practiced to produce substantially whole wood fibers. Practically considered, the fibers discharged from such processing are regarded as whole wood fibers and in commerce have been utilized as such. However, they they are to a degree altered. Raw wood generally, having normally about 4% by weight of natural water-soluble content, is commercially defibered in the Asplund machine at a steam pressure most favorable to the specific wood, such as 135 p. s. i. g. for aspen and 130 to 160 p. s. i. g. for Douglas fir, in from 30 to 60 seconds, with a resulting increase in water-soluble content, for example, to about 7% to 10%, the increase varying with conditions. The alkali-neutralizing capacity of the wood substance is thus increased. The pH value of the raw wood and of the steamed wood hovers around pH of 4 with non-significant deviations.

The fiber above described as the product of the Asplund process is the result of the reactions in the steam environment and of the mechanical reduction of the wood substance to fiber form. For the purposes of the present invention these two results may be achieved one independently of the other. Wood chips may be steamed, and then defibered out of a steam environment. Or wood may be mechanically defibered or comminuted to fiber-exposing particles without any action by steam, and then steamed. The Asplund defibering chamber may be coupled to continuously receiving and discharging chambers at either or both ends, for controlling the time and hence the acid-generation for the present invention, and hence the alkali-neutralizing capacity of the fibers.

The present invention contemplates use of the alkali-neutralizing capacity of raw or steamed fibers to change the pH of an aqueous solution of resin-forming solids, which solution is of such character that the addition of acid thereto lowers the pH of the solution to a value at which at least some of the content of resin-forming solids is precipitated. It is not essential that the resin solution be alkaline, and if it is, that it become neutral or acid to effect the precipitation. Any resin solution may be used which precipitates the desired solids by lowering its pH by reaction with acids present in wood particles.

Because acid-reacting material utilized in the present invention resides on or within the wood particles which are to be coated with binder resin and are present in water-soluble content thereof, the resin solution is applied to the surfaces of the fibers in gaseous suspension so as to effect the deposition in situ by the acid carried by the fiber. For this reason the wood particles are not maintained in liquid suspension for effecting the deposition. Also, to minimize the possibility of penetration of the fiber by resin solution, as takes place to some degree when applying such a solution to dry wood particles, the wood particles to be coated are preferably maintained with a sufficient moisture content to afford a transport system for movement of water-soluble acid from the interior to the surface.

Just where the lower limit of moisture content lies for effecting a transport system depends on numerous factors including temperature as well as the kind of wood. So-called "dry fibers" sorb and yield water vapor in equilibrium with the surroundings up to about 30 parts of water to 100 parts of moisture-free fiber. This amount of water is "bound water" not active as liquid water. Additional water or moisture content is free water present in lumens, pits, ray cells and other inter- and intra-fiber spaces. This free water provides a transport system for diffusion of water-soluble material including acid. Especially, it brings interior acid to the surface. It is not necessary that the wood particles which are to be subjected to contact with the resin solution have a transport system, because water from the applied solution will be taken up to a degree at least to yield such a transport system. Where wet steamed wood particles have been dried to a degree less than sufficient for a transport system, the very process of drying carries the water-soluble content to the surfaces where its acid content is immediately available for reaction with applied resin solution for the purposes of the present invention.

Diffusion of material within a fiber depends upon the material being in solution. In general, temperature increases solubilities, and higher temperatures at the time of applying the resin solution are favorable to the present invention. However, higher temperatures and the duration thereof must be considered with respect to advancing the resin toward or to an ineffective state.

Since wood substance is normally acid at a pH considerably below 7 and around 4, it is the preferred practice of the present invention to associate the wood particle and the resin solution in such proportion as to provide a residual coated wood particle at a pH of 7 or below, and preferably below. Wood at pH of 7 or below has certain constituents which are fusible, including complex substances having phenolic properties. The fusing of these in using the wood particles for hot pressing increases the flow of the thermosetting mass containing them. But when the pH is higher than 7, as will appear hereinafter, these constituents become salts and do not fuse at all or to the same extent. Other reasons exist for maintaining the wood particles on the acid side of pH 7. Thus, in using a resin solution in which substantially all of the resin content is precipitable at a pH above 7 and in the presence of alkaline material subject to neutralization, the amount of such solution employed is preferably such that after the resin solids are precipitated, the acid continues reaction with the alkaline content to neutralize all of it, and thus provide resin-coated particles at pH of 7 or below. This will be more readily appreciated from the following explanation based upon a typical raw wood fiber and a steam-treated form thereof, and a typical alkali-stabilized resin solution.

*Wood fiber No. 1.*—Douglas fir is combined with a device having high speed rotary defibering pins as in the MacMillan U. S. Patents Nos. 1,344,180; 1,476,032 and 1,515,062, to produce whole wood fiber substantially all to suitable wood particle form. This fiber may be suitably mixed with a described resin solution in proper proportion to precipitate all of the resin on the fiber, by avoiding a suspending liquid and using a gaseous environment inert to the acid and alkali involved. The limiting amounts of these materials for different final pH values is determined by relating the acid properties of the wood to the opposing properties of the solution.

*Wood fiber No. 2.*—Douglas fir chips are defibered in an Asplund defibrator substantially enirely to ultimate fibers and opened up bundles of ultimate fibers at a steam pressure of 140 p. s. i. g. and in a time period of 30 to 60 seconds. This processing is conventional for defibering such wood to a light-colored fiber which is commercially considered to be whole wood fibers, and in itself this processing is but one step in one species of the present invention, yet a step subject to controlled variation. The said defibering creates acid and also an increased content of water-solubles upwardly from a content of about 5% to a total of about 8%, in which water-soluble content non-volatile acids are present and useful for effecting deposition of resin on the fiber.

Because of the complex nature of the natural and the generated acids, the alkali-neutralizing capacity of the fiber varies with the pH to which neutralization is effected. Accordingly a method is offered for evaluating wood particle material to be used in the present invention, in order to determine the limiting amount of any suitable resin solution to be applied for the purposes herein set forth. As an example of such a method, a given amount of fiber is suspended in a small quantity of water so that the suspension may be titrated with a standardized alkali solution, preferably 0.1 normal sodium hydroxide, and so that the resulting pH of the suspension may be determined. Time is required for the suspension to attain an equilibrium condition by reason of the necessity for diffusion between the fibers and the suspending liquid. This procedure of measuring pH values by immersing the wood substance in water is standard test procedure.

The following Table I shows in column 1 the pH of such a titrated suspension containing 100 grams of the above described raw Douglas fir fiber No. 1 (oven-dry basis). Column 2 shows the hydrogen equivalents of sodium hydroxide used in titrating the suspension to attain the pH values of column 1. The values of column 2 are given as hydrogen equivalents for the purpose of plotting with like values from Table II as shown in the accompanying drawing.

Table I

| 1 pH | 2 NaOH Equivalents × 10⁻³ |
|---|---|
| 4.30 | 0.0 |
| 4.80 | 1.3 |
| 5.35 | 2.2 |
| 5.90 | 3.4 |
| 6.25 | 4.5 |
| 6.55 | 5.2 |
| 7.05 | 6.1 |
| 7.15 | 6.9 |
| 8.35 | 8.2 |
| 8.65 | 9.1 |
| 8.85 | 10.2 |
| 9.10 | 11.1 |
| 9.20 | 11.8 |
| 9.30 | 12.6 |
| 9.30 | 13.2 |

Table II is similar to Table I, using the same amount of wood substance but as the said Asplund-formed No. 2 fiber.

Table II

| 1 pH | 2 NaOH Equivalents × 10⁻³ |
|---|---|
| 3.65 | 0.000 |
| 4.00 | .825 |
| 4.15 | 1.680 |
| 4.20 | 2.25 |
| 4.70 | 2.47 |
| 5.12 | 3.70 |
| 5.50 | 4.85 |
| 5.80 | 6.25 |
| 6.00 | 7.18 |
| 6.50 | 9.44 |
| 6.82 | 10.67 |
| 7.00 | 11.50 |
| 7.40 | 11.98 |
| 8.90 | 15.00 |
| 9.10 | 15.75 |
| 9.12 | 16.45 |
| 9.15 | 16.85 |
| 9.20 | 17.60 |
| 9.32 | 18.70 |

*Resin solution A.*—There is available on the market a certain aqueous solution of a condensation product of 1 mole of phenol and 2 to 2.5 moles of formaldehyde containing sodium hydroxide in sufficient quantity (3.5% by titration to pH of 7) to maintain the resin solids in solution at a weight concentration of 36.5 parts per 100 parts of solution. The resin solids have a hot-plate cure at 150° C. of 9±3 seconds. Such a solution is typical of other resin solutions, of which others are hereinafter referred to.

Resin solution A may be gradually acidified, thus to neutralize alkaline content, and thus to lower the pH value of the resultant solution. In doing this a pH is reached first at which the solution becomes cloudy, evidencing the beginning of a precipitation of resin solids. Then a pH is reached at which precipitation is complete. At this pH the solution may still be alkaline, so that thereafter the titration may be continued to lower the pH to 7 at which point all the alkali is neutralized.

Table III shows the result of titrating resin solution A with 0.1 normal hydrochloric acid. Column 1 shows the pH of the solution; column 2 shows the hydrogen equivalents of hydrochloric acid per gram of resin solids; and column 3 shows the condition of the solution as to resin content.

Table III

| 1 pH | 2 Equivalents of HCl×10⁻³ | 3 Condition |
|---|---|---|
| 10.4 | 0 | Clear solution. |
| 9.2 | 1.39 | Turbidity. |
| 8.9 | 1.92 | Precipitation complete. |
| 7.0 | 2.38 | |

In the accompanying drawing the base line 10 is a scale of pH values on which are plotted the pH value of Tables I and II against the hydrogen equivalents of Table I and Table II on the vertical scale 11. This plotting results in curve 12 showing the alkali binding power of the wood acids in fiber No. 1 for the various pH values attained in so using the wood acids. Curve 13 shows the hydrogen equivalents utilized by the resin solution A in leading to the precipitation of its resin content and following it to the point of complete neutralization of the alkali content. Curve 14 is a graph like curve 12 resulting from fiber No. 2.

From the plot may be read the amount of the resin solids as resin solution A, which may be used on either fiber to precipitate resin and to provide residual wood substance at any selected pH. The following cases illustrate:

(1) *To use the maximum amount of resin and provide residual wood at the pH of resin precipitation, namely 8.9.*—Curve 14 for fiber No. 2 at point 15 corresponds to said pH and shows that 15.0 units of the wood acids are available in 100 grams of the fiber (O. D. basis). Curve 13 at point 16 shows that in order to precipitate one gram of the resin, 1.92 units of acid are required to attain pH of 8.9. Dividing 15.0 by 1.92 indicates that 7.8 grams of resin may be precipitated by the wood acids available in 100 grams of the fiber No. 2.

(2) *To use sufficient resin to provide neutral fibers at pH of 7.*—Curve 14 for fiber No. 2 at point 17 shows that 11.5 units of wood acids are available to attain this neutral state. Curve 13 at point 18 shows that one gram of resin requires 2.38 units of acid to attain the neutral state of pH of 7. Dividing 11.5 by 2.38 gives 4.85 as the grams of resin solids which may be used per 100 grams of the fibers to attain fibers No. 2 at pH of 7.

(3) *To use sufficient resin to provide residual fibers at pH of 5.5.*—Point 18 on curve 13 shows a maximum of 2.38 units of acid required to neutralize all the available alkali in resin solution A which is associated with one gram of resin solids. Point 19 on curve 14 shows that at pH of 5.5 only 4.85 units of acid are available. Dividing 4.85 by 2.38 gives 2.02 grams of resin from resin solution A per 100 grams of fiber No. 2.

(4) *To use sufficient resin to yield residual fibers of pH 4.5*—Point 18 shows that 2.38 units of acid are required to neutralize all the free alkali associated with one gram of resin solids. Point 21 on curve 14 shows that approximately 2.3 units of acid are available in 100 grams of fiber No. 2 to attain pH of 4.5. Dividing 2.3 by 2.38 gives 0.97 as the grams of resin solids as resin solution A which will provide the desired residual fiber No. 2, as a resin-coated fiber having approximately the pH of raw wood.

In the same way, it may be determined that lower usages of resin A solution are required by fiber No. 1 for the same end pH values. The vertical distance at any pH value between the graphs 12 and 14 represents the greater acid content effected by said conventional defibering in the Asplund machine. To provide resin coated fibers of pH 7, almost twice as much resin may be applied to the steamed fibers compared to the raw fibers, because the steamed fibers will provide almost twice as much acid as the raw fibers, by reason of the generated acid content. This generated acid may be increased by more effective steam treatment as described. Pressures from atmospheric up to 200 p. s. i. g. may be used for varying limiting times of not more than about 2 minutes at 200 p. s. i. g. to longer times as the pressure is less, and even for hours at atmospheric pressure steam.

As a matter of practical experience, fiber corresponding to the described fiber No. 2, namely Asplund-defibered Douglas fir, has been treated with said resin solution A in usages varying over a wide range, and including specific usages by weight of 1, 2 and 5 parts of resin solids per 100 parts of fiber (oven-dry basis), and the resulting resin-coated fibers have been utilized in various ways for the production of hot-pressed hard fiberboards, and other and intermediate products. Such fibers with as little as 1% of such resin give excellent strength in such boards, due to the efficient distribution of the resin solids over the surfaces by the precipitation described; and such boards have a light natural wood color.

Where the invention is carried out by discharging a current of vehicular steam and of wood particles containing the wood acids, in an elongated conduit, for example, one connected to an Asplund machine, the proportioned amount of an alkaline resin solution at any effective dilution is sprayed into the stream of fibers thereby to apply liquid films to the fibers for inducing the resin precipitation. If and when there is a content of volatile acid in the vehicular steam, as there frequently is a small amount of acetic acid, this acid is taken up by the applied liquid and utilized to supplement the precipitation of resin by the non-volatile acid content of the fiber.

Such mixing in a conduit is further desirable because the fibers intermingle and rub to effect more uniform distribution of the applied liquid on the fibers. However, conduction of the resin-carrying fibers for too long a time at elevated temperature in steam is avoided in order to minimize loss of thermosetting properties in the deposited resin. The coated fibers may be separated from the vehicular steam in a cyclone, and thereafter treated as desired, such as by cooling or drying or other treatment maintaining thermosetting properties, or finally utilizing the thermosetting properties. A moist mat having 25% content of moisture and consisting of fibers No. 1 or No. 2, treated as described above, may be hot pressed between insulated platens at 400° F. under mechanical pressure over a wide range to form resin-bound panels of a wide range of densities. Such practice is more specifically claimed in my copending application Serial No. 334,164, filed January 30, 1953.

Steam-treated fibers which are cool and suitably moist may be gradually treated in a mechanical mixer by regulated addition of resin solution. Addition is controlled to avoid overloading one portion of the wood mass with resin with neglect to treat other portions. Mixing to uniformity of distribution follows.

By subjecting raw wood only to the action of steam under non-gasifying conditions, by avoiding suspensions in water which would extract organic matter, and by applying the resin solution in a gaseous environment, the resin-treated wood particles contain substantially all the organic substance of the original wood from which they are derived, and are in fact whole wood particles.

The foregoing description exemplifies the manner in which the wood particles and a precipitable resin solution may be evaluated for determining the proportions of usage for predetermined results. It is to be understood that both materials may be other than those illustrated. Wood of many species and a variety of treatments for it are contemplated. There are many kinds and grades of thermosetting resin material which are stabilized in aqueous solution and which are precipitable therefrom by lowering the pH. Illustrative ones are resorcinol-formaldehyde, xylenol-formaldehyde, melamine-formaldehyde, and like resins in which the aldehyde is furfuraldehyde or acetaldehyde. Numerous kinds of wood and treatments thereof, as well as numerous kinds of resin, are contemplated as falling within the scope of the invention as set forth in the accompanying claims.

Reference is made to my copending application Serial No. 542,001 which was filed October 21, 1955, as a continuation-in-part of Serial No. 313,496, filed October 7, 1952, now abandoned, which application Serial No. 542,001 is generic to certain aspects of the present disclosure.

I claim:

1. The method which comprises mixing in a gaseous environment particles containing substantially all the organic substance of whole wood in forms exposing substantially all the ultimate fibers of the wood with a predetermined amount of aqueous solution of thermosetting resin solids, which solution contains a hydrogen equivalence of material neutralizable by acid, which material maintains a relatively elevated pH for said solution at which resin solids are in solution, and which material upon neutralization by acid effects a lowered pH and thereby causes precipitation of substantially all of said resin solids, the amount of said solution applied to said wood particles being limited so that the hydrogen equivalence of said solution does not exceed the hydrogen equivalence of the associated wood particles predetermined at the pH at which said resin solids are substantially all precipitated.

2. The method which comprises mixing in a gaseous environment particles containing substantially all the organic substance of whole wood in forms exposing substantially all the ultimate fibers of the wood with a predetermined amount of aqueous solution of thermosetting resin solids, which solution contains a hydrogen equivalence of material neutralizable by acid, which material maintains a relatively elevated pH for said solution at which resin solids are in solution, and which material upon neutralization by acid effects a lowered pH and thereby causes precipitation of substantially all of said resin solids, the amount of said solution applied to said wood particles being limited so that the hydrogen equivalence of said solution does not exceed the hydrogen equivalence of the associated wood particles predetermined at a pH below 7 and not over the pH at which said resin solids are substantially all precipitated.

3. The method which comprises mixing in a gaseous environment particles of raw whole wood in forms exposing substantially all the ultimate fibers of the wood with a predetermined amount of aqueous solution of thermosetting resin solids, which solution contains a hydrogen equivalence of material neutralizable by acid, which material maintains a relatively elevated pH for said solution at which resin solids are in solution, and which material upon neutralization by acid effects a lowered pH and thereby causes precipitation of substantially all of said resin solids, the amount of said solution applied to said wood particles being limited so that the hydrogen equivalence of said solution does not exceed the hydrogen equivalence of the associated wood particles predetermined at the pH at which said resin solids are substantially all precipitated.

4. The method which comprises mixing in a gaseous environment particles of raw whole wood in forms exposing substantially all the ultimate fibers of the wood with a predetermined amount of aqueous solution of thermosetting resin solids, which solution contains a hydrogen equivalence of material neutralizable by acid, which material maintains a relatively elevated pH for said solution at which resin solids are in solution, and which material upon neutralization by acid effects a lowered pH and thereby causes precipitation of substantially all of said resin solids, the amount of said solution applied to said wood particles being limited so that the hydrogen equivalence of said solution does not exceed the hydrogen equivalence of the associated wood particles predetermined at a pH below 7 and not over the pH at which said resin solids are substantially all precipitated.

5. The method which comprises both mechanically comminuting wood to particles of sizes to expose substantially all the ultimate fibers thereof and heating the substance of the wood under non-gasifying conditions in an environment of steam at a temperature corresponding to a range of pressures from atmospheric pressure to 200 p. s. i. g., whereby to generate and retain acids deriving from natural constituents of the wood, the hydrogen equivalence of said wood particles increasing with increase of time and increase of temperature in said steam environment, applying to the surfaces of a predetermined quantity of the resulting particles in a gaseous environment a predetermined amount of aqueous solution of thermosetting resin solids, which amount of solution contains a hydrogen equivalent of material neutralizable by acid, which material maintains a relatively elevated pH for said solution at which resin solids are in solution, and which material upon neutralization by acid effects a lower pH and thereby causes precipitation of substantially all of said resin solids, the amount of said solution applied to said wood particles being limited so that the hydrogen equivalence of the solution does not exceed the hydrogen equivalence of the associated wood particles predetermined at the pH at which said resin solids are substantially all precipitated.

6. The method which comprises both mechanically comminuting wood to particles of sizes to expose substantially all the ultimate fibers thereof and heating the substance of the wood under non-gasifying conditions in an environment of steam at a temperature corresponding to a range of pressures from atmospheric pressure to 200 p. s. i. g., whereby to generate and retain acids deriving from natural constituents of the wood, the hydrogen equivalence of said wood particles increasing with increase of time and increase of temperature in said steam environment, applying to the surfaces of a predetermined quantity of the resulting particles in a gaseous environment a predetermined amount of aqueous solution of thermosetting resin solids, which amount of solution contains a hydrogen equivalence of material neutralizable by acid, which material maintains a relatively elevated pH for said solution at which resin solids are in solution, and which material upon neutralization by acid effects a lower pH and thereby causes precipitation of substantially all of said resin solids, the amount of said solution applied to said wood particles being limited so that the hydrogen equivalence of the solution does not exceed the hydrogen equivalence of the associated wood particles predetermined at a pH below 7 and not over the pH at which said resin solids are substantially all precipitated.

7. The method which comprises both mechanically comminuting wood to particles of sizes to expose substantially all the ultimate fibers thereof and heating the substance of the wood under non-gasifying conditions in an environment of steam at a temperature corresponding to a range of pressures from atmospheric pressure to 200 p. s. i. g., whereby to generate and retain acids deriving from natural constituents of the wood, the hydrogen equivalence of said wood particles increasing with increase of time and increase of temperature in said steam environment, applying to the surfaces of a predetermined quantity of the resulting particles in a gaseous environment a predetermined amount of aqueous solution of thermosetting resin solids, which amount of solution contains a hydrogen equivalence of material neutralizable by acid, which material maintains a pH above 7 for said solution at which resin solids are in solution, and which material upon neutralization by acid effects a lower pH above 7 and thereby causes precipitation of substantially all of said resin solids, the amount of said solution applied to said wood particles being limited so that the hydrogen equivalence of the solution does not exceed the hydrogen equivalence of the associated wood particles predetermined at the pH at which said resin solids are substantially all precipitated.

8. The method which comprises both mechanically comminuting wood to particles of sizes to expose substantially all the ultimate fibers thereof and heating the substance of the wood under non-gasifying conditions in an environment of steam at a temperature corresponding to a range of pressures from atmospheric pressure to 200 p. s. i. g., whereby to generate and retain acids deriving from natural constituents of the wood, the hydrogen equivalence of said wood particles increasing with increase of time and increase of temperature in said steam environment, applying to the surfaces of a predetermined quantity of the resulting particles in a gaseous environment a predetermined amount of aqueous solution of thermosetting resin solids, which amount of solution contains a hydrogen equivalence of material neutralizable by acid, which material maintains a pH above 7 for said solution at which resin solids are in solution, and which material upon neutralization by acid effects a lower pH above 7 and thereby causes precipitation of substantially all of said resin solids, the amount of said solution applied to said wood particles being limited so that the hydrogen equivalence of the solution does not exceed the hydrogen equivalence of the associated wood particles predetermined at a pH below 7.

9. The method which comprises both mechanically comminuting wood to particles of sizes to expose substantially all the ultimate fibers thereof and heating the substance of the wood for about 30 to 60 seconds in an environment of steam at a temperature corresponding to a pressure in the vicinity of 140 p. s. i. g., whereby to generate and retain acids deriving from natural constituents of the wood, applying to the surfaces of a predetermined quantity of the resulting particles in a gaseous environment a predetermined amount of aqueous alkaline solution of thermosetting phenol-formaldehyde resin solids, which amount of solution contains a hydrogen equivalence of material neutralizable by acid, which material maintains a relatively elevated pH above 8.9 for said solution at which resin solids are in solution, and which material upon neutralization by acid effects a pH of about 8.9 and thereby causes precipitation of substantially all of said resin solids, the amount of said solution applied to said wood particles being limited so that the hydrogen equivalence of the solution does not exceed the hydrogen equivalence of the associated wood particles predetermined at a pH of 7.

10. Thermosetting material comprising wood particles exposing substantially all the ultimate fibers of the wood and containing substantially all the organic substance of the raw wood from which the particles are derived, and thermosetting resin-forming solids on the surfaces thereof as solids, the resulting coated particles including the products of reaction of acid material derived from the wood and material of higher pH value than said acid material deriving from a solution of said resin solids.

11. The product of claim 10 at a pH value below 7.

12. The method comprising mixing in a gaseous environment wood particles and a predetermined quantity of aqueous solution of thermosetting resin solids, said wood particles containing substantially all the organic substance of the whole wood in forms exposing substantially all the ultimate fibers of the wood and said particles including acid content which is substance of the original wood, said solution having a stabilizing pH above that of said wood particles and being characterized by precipitation of substantially all of said resin solids at a lower precipitating pH above that of said wood particles, and proportioning the quantities of said solution and of said wood particles so that substantially all of the resin is precipitated on said wood particles, the acidity of the wood particles serving to lower the pH of the solution at least to said precipitating pH, and the solution serving to elevate the pH of the wood particles to a value not over said precipitating pH.

References Cited in the file of this patent

UNITED STATES PATENTS

| | | |
|---|---|---|
| 1,160,365 | Baekeland | Nov. 16, 1915 |
| 2,247,208 | Schorger | June 24, 1941 |
| 2,292,389 | Meiler | Aug. 11, 1942 |
| 2,292,390 | Meiler | Aug. 11, 1942 |
| 2,402,160 | Heritage | June 18, 1946 |
| 2,405,213 | Heritage | Aug. 6, 1946 |
| 2,538,742 | Willey | Jan. 16, 1951 |
| 2,553,412 | Heritage | May 15, 1951 |
| 2,612,445 | Spence | Sept. 30, 1952 |

OTHER REFERENCES

"Synthetic Resins & Allied Plastics" by Morrell, 3rd. ed. pages 129–132, published by Oxford University Press, New York. (1951.)